H. J. SNYDER.
CORN-PLANTER.
No. 182,864. Patented Oct. 8, 1876.
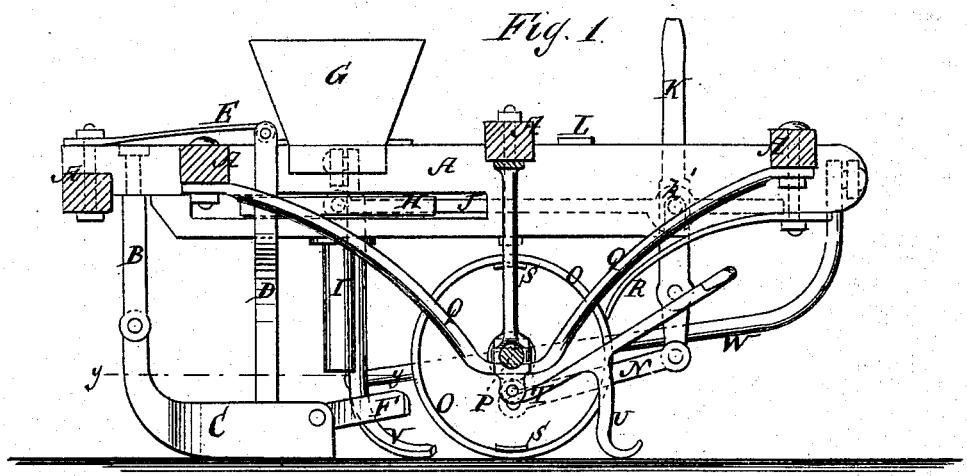
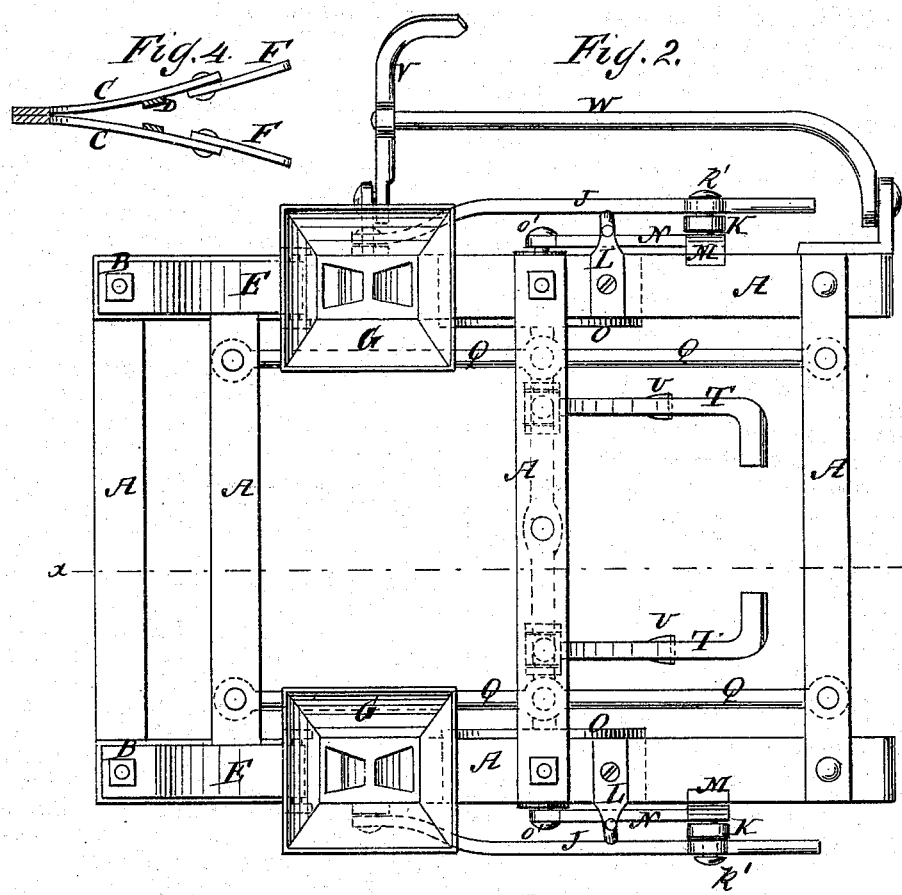
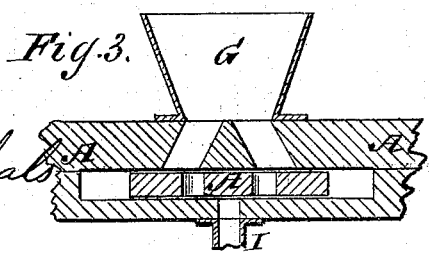
WITNESSES:
E. Wolff
John Goethals
INVENTOR:
H. J. Snyder
BY
Munn & Co.
ATTORNEYS.

UNITED STATES PATENT OFFICE.

HENRY J. SNYDER, OF ADAMS, (EVANSPORT P. O.,) OHIO.

IMPROVEMENT IN CORN-PLANTERS.

Specification forming part of Letters Patent No. 182,864, dated October 3, 1876; application filed June 26, 1876.

*To all whom it may concern:*

Be it known that I, HENRY JACOB SNYDER, of Adams, (Evansport P. O.,) in the county of Defiance and State of Ohio, have invented a new and useful Improvement in Corn-Planter, of which the following is a specification:

Figure 1 is a vertical longitudinal section of my improved corn-planter, taken through the line $x\ x$, Fig. 2. Fig. 2 is a top view of the same. Fig. 3 is a detail vertical section of the seed-dropping device. Fig. 4 is a detail section of the furrow-opening device, taken through the line $y\ y$, Fig. 1.

Similar letters of reference indicate corresponding parts.

The object of this invention is to furnish an improved machine which shall be so constructed as to open a furrow, drop the seed, cover it, and mark the hills and rows, so that the field may be planted in perfect check-row, and which shall be simple in construction, convenient in use, and reliable in operation.

The invention will first be described in connection with the drawing, and then pointed out in the claims.

A is the frame of the machine, to the forward part of the side bars of which are attached downwardly-projecting arms B, to the lower ends of which are hinged the forward ends of the runners C. The rear part of the runners C are forked, to push back the soil and open a furrow to receive the seed. To the runners C, a little in front of their rear ends, are attached the lower ends of the uprights D, which pass up upon the opposite sides of the side bars of the frame A, and the upper ends of each pair are connected, just above the said side bars, by a bolt, upon which rests the rear ends of the springs E. The forward ends of the springs E are attached to the forward ends of the side bars of the frame A. The springs E thus hold the runners C down to their work under ordinary circumstances; but should the runners strike a rock, root, or other obstruction, they will rise and pass over it, and will then be forced down to their work by the said springs E. To the rear ends of the runners C are attached the narrow wings F, by which stones, clods, &c., are pushed back out of the way of the wheels. G are the seed-hoppers, which are attached to the side bars of the frame A, over the rear end of the runners C. In the bottom of the hoppers G are formed two holes, leading down into a long slot in the side bars of the frame A, where the seed enters a hole in the sliding plates H, by which it is carried over and dropped into the upper end of the conductor-spout I, and passes through it to the ground. To the outer edges of the dropping-slides H are pivoted the forward ends of the bars J, the rear parts of which have notches formed in their lower edges, to receive the pins $k'$, attached to the levers K. The rear ends of the bars J project in the rear of the levers K, to serve as handles for placing them in and out of gear. When out of gear the bars J rest upon hooks L, attached to the side bars of the frame A. The levers K, about midway between their lower ends and the pins $k'$, are pivoted to the lower ends of arms M, attached to the side bars of the frame A. To the lower ends of the levers K are pivoted the rear ends of the bars N, the forward ends of which are pivoted to crank-pins $o'$, attached to the wheels O, so that the seed may be dropped by the advance of the machine. The wheels O are made with wide rims, are placed directly beneath the side bars of the frame A, and revolve upon the journals of the axle P, which is connected with the said frame A by the braces Q. To the side bars of the frame A are attached plates R, to scrape off any soil that may adhere to the rims of the wheels O. To the inner side of the rims of the wheels O are attached two plates, S, which project upon the inner sides of said wheels, to mark the ground at the side of each wheel, and thus show the cross-rows. To the axle P, near each wheel O, is hinged the forward end of a lever, T, the rear end of which has a foot-rest formed upon it. To the levers T, near their forward ends, are attached feet U, which serve as fulcrums when the rear ends of the said levers are pressed downward to enable the driver to raise one or the other of the wheels O from the ground when starting in at the side of the field, to adjust the said wheels, so that the markers S may mark the ground in line with the previous marks. When the wheels O have been adjusted the bars J are raised from the hooks L, and hooked upon the pins $k'$ of the levers K, and the machine will drop the hills in line with the cross-rows. To the outer sides of the side bars of the frame A, and about in line with the conductor-spouts I, are pivoted the upper ends of two bars, V, the lower ends of which are curved to the rearward, to drag upon and mark the ground in line with the rows, to serve as a guide to the driver in the return passage.

The draft-strain upon the marker V is sustained by the brace-bar W, the forward end of which is attached to the middle part of the bar V, and its rear end is curved upward, and is pivoted to the rear part of the side bar of the frame A.

Having thus described my invention, I claim as new and desire to secure by Letters Patent—

1. The combination of runners C, pivoted to arms B, the uprights D, connected above the side bars of frame by a bolt, and the springs E, resting on said bolts, as and for the purpose specified.

2. The combination of the dropping-slide H, the notched connecting-rod J, the pivoted lever K, the connecting-rod N, and the crank-pin $o'$ with the side bar of the frame A, the seed-hopper G, and the wheel O, substantially as herein shown and described.

3. The combination of the pivoted marking-bar V and the curved brace-bar W with the side bars of the frame A, substantially as herein shown and described.

HENRY JACOB SNYDER.

Witnesses:
AARON DIEHL,
ALFRED A. METZ.